United States Patent
McCarthy et al.

(10) Patent No.: US 10,049,597 B2
(45) Date of Patent: *Aug. 14, 2018

(54) INTERACTIVE TRAINING DEVICE

(71) Applicants: John Vincent McCarthy, Los Angeles, CA (US); Robert Story, West Hollywood, CA (US)

(72) Inventors: John Vincent McCarthy, Los Angeles, CA (US); Robert Story, West Hollywood, CA (US)

(*) Notice: Subject to any disclaimer, the term of this patent is extended or adjusted under 35 U.S.C. 154(b) by 25 days.

This patent is subject to a terminal disclaimer.

(21) Appl. No.: 15/192,982

(22) Filed: Jun. 24, 2016

(65) Prior Publication Data

US 2016/0307462 A1    Oct. 20, 2016

Related U.S. Application Data

(63) Continuation-in-part of application No. 14/257,824, filed on Apr. 21, 2014, now Pat. No. 9,398,835.

(60) Provisional application No. 62/279,933, filed on Jan. 18, 2016.

(51) Int. Cl.
| | |
|---|---|
| *E03D 1/00* | (2006.01) |
| *G09B 19/00* | (2006.01) |
| *A47K 13/06* | (2006.01) |
| *G09B 5/02* | (2006.01) |
| *A47K 13/24* | (2006.01) |
| *A47K 17/00* | (2006.01) |

(52) U.S. Cl.
CPC .......... *G09B 19/0076* (2013.01); *A47K 13/06* (2013.01); *A47K 13/24* (2013.01); *A47K 17/00* (2013.01); *G09B 5/02* (2013.01)

(58) Field of Classification Search
CPC ........................................................ E03D 5/10
USPC ..................................................... 4/300–442
See application file for complete search history.

(56) References Cited

U.S. PATENT DOCUMENTS

| | | | | |
|---|---|---|---|---|
| 9,380,918 B2* | 7/2016 | Murphy | .................. | A47K 13/24 |
| 9,398,835 B2* | 7/2016 | McCarthy | .............. | A47K 17/00 |
| 2016/0313636 A1* | 10/2016 | Chien | .................... | G03B 29/00 |

* cited by examiner

*Primary Examiner* — Lori Baker
(74) *Attorney, Agent, or Firm* — Kleinberg & Lerner, LLP; Marvin H. Kleinberg; Marshall A. Lerner

(57) ABSTRACT

An interactive device that is an accessory to a flush toilet and is positioned at the rear of the flush toilet and may be attached to the rear of the toilet such that the user would use the flush toilet in the reverse position. The interactive device may include a toy, game, computer, or projector. The interactive device may be secured to the toilet by straps or to the toilet lid hinges and may be detachable from the flush toilet. The interactive device may be a seat insert with a projector to display images on the toilet lid or cistern. The interactive device makes "going to the bathroom" enjoyable for both the child and parent, while educating the child to appreciate and to become more accustomed to using a flush toilet.

6 Claims, 6 Drawing Sheets

INTERACTIVE TRAINING DEVICE

RELATED U.S. APPLICATION DATA

This is a Continuation-In-Part application of U.S. patent application Ser. No. 14/257,824, filed on Apr. 21, 2014, the entire disclosure of which is incorporated herein by reference. This Continuation-In-Part application claims the benefit of U.S. provisional patent application No. 62/279,933, filed on Jan. 18, 2016, the entire disclosure of which is incorporated herein by reference.

BACKGROUND OF THE INVENTION

1. Field of the Invention

The present invention relates to educational devices and toys, and more specifically, educational toys for toilet training that are compactable for storage when not in use.

2. General Background and State of the Art

The toilet training products that exist today tend to focus on the child (i.e. infant/toddler/preschooler) learning to toilet train on a toy version of a "flush toilet" where the toy version of the toilet has no flushing mechanism and drainpipe. Whether using the toy version toilet or an actual toilet, traditional toilet training methods involve the child being required to sit in an "adult style" manner over the toilet bowl wherein the child is facing away from the toilet's cistern or flushing mechanism components. Sitting in this manner substantially reduces the child's sensory and cognitive perception of the physical presence and functionality of the flush toilet. By attempting to teach children to use the toilet in this adult style, children ultimately have less appreciation of the toilet and may establish an early aversion towards using the toilet. Training that requires adult style toilet use only further delays the child's potty training and provokes greater anxiety in the parent and child. Traditional training results in parents spending more money on diapers and ineffective training products.

A child who learns how to say "no" coupled with a child's early reasoning skills are further delayed in their training because they are capable of expressing refusal to use a flush toilet. Such aversion for a flush toilet may arise from the child having a very limited perception and appreciation of the flush toilet. Jean Piaget (the world renowned child psychologist) spoke of Object Constancy, which explains that to a child, an object that he/she cannot see does not exist. When a child begins to use a flush toilet or toy version of a toilet and is instructed to turn their back away from the toilet during its use, the toilet immediately ceases to exist in their minds. Their purpose of sitting on the toilet is lost. No reward or motivation is offered to have the child sit and engage with the toilet long enough to increase their sensory and cognitive perception of the flush toilet. Offering a reward or motivation to spend more time on the toilet with a greater perception of the toilet will allow the child to become more familiar with the toilet and resolve the problems that are encountered using the traditional methods of toilet training.

The toilet training products that exist today tend to focus on the child learning to toilet train on a toy version of a flush toilet or by sitting "adult style" on a flush toilet with some type of child seat insert. While some of these products are constructed with playful colors and shapes, the child ultimately loses focus of the flush toilet because the adult style use of the toilet effectively eliminates all view and perception of the toilet.

Toilet training adult style also has its risks which make the parent and child more anxious each time they train. The toilet lid may inadvertently fall on to the child. In some instances, a child may fall into the toilet bowl since there is nothing the child can hold on to for added support and security. Keeping the child focused on the toilet lid, flushing mechanism, or cistern as well as securing the toilet lid from falling down would reduce or eliminate such risk, and thus eliminate the anxiety. With less fear, the child would learn to appreciate the use of the flush toilet.

Even after children learn how to use the flush toilet, they often later refuse to go back on the toilet. Children do not associate using the flush toilet with reward and entertainment. Children exhibit regressive behavior in using the flush toilet and parents are often forced to buy diapers such as "Pull Ups®" diapers for toddlers and pre-school children, in order to offset many "mistakes" children may encounter. An internet search for "toilet training" demonstrates that "Pull Ups®" are also one of the first hits for sponsored websites which demonstrates how the market has responded to the parent's insecurity about the inadequacies in flush toilet training.

It is desirable to have a device that will help a child realize the existence of a flush toilet through the reward of fun and enjoyment. Further, the desired device would build a positive association and durable long-lasting lesson thereby making parents feel more secure with their child's toilet training.

INVENTION SUMMARY

One of the inventors, as one of twelve children, has never understood why parents are not toilet training their children the way his mother had trained him and his siblings in using a flush toilet. The interactive device of the present invention works with a flush toilet training called Reverse Toilet Training (RTT). With RTT, a child is positioned over the toilet bowl in a reverse fashion, i.e., facing the rear of the toilet where the toilet lid and flushing mechanism may be located. The flushing mechanism may include the toilet cistern, piping leading up to a raised cistern, a flushing valve stem and handle commonly found on commercial toilets, the flushing handle, or the flush button.

Sitting with his/her legs straddling the toilet seat or squatting over the toilet bowl, the child is looking straight into the rear of the flush toilet wherein the child may view the flushing mechanism or the raised and upright toilet lid and/or the toilet cistern. The present invention is an accessory to a flush toilet in which an interactive device is positioned at the rear of the toilet and may be attached (e.g. suction cups, adhesive, or straps that wrap around the toilet lid or cistern) to the rear of the toilet. The present invention may be an interactive device such as a toy/game with which the child may play while learning to use the toilet. The child may also continue to use the interactive device when not using the toilet wherein said interactive device is detachable from the toilet. The present invention makes "going to the bathroom" enjoyable for both the child and parent, while educating the child to appreciate and use a flush toilet.

In an alternative embodiment of the present invention, an insert may be placed onto the top of the toilet bowl or toilet seat. The insert may reduce the diameter of the opening of the toilet bowl, thereby reducing the chance a child may fall into the toilet. The insert will give the child the orientation needed to "go to the bathroom" in the reverse position. An insert may be configured as a child seat insert with a supportable back, lower plush grooved areas for the child's legs/thighs, and with a barrier on the side of the insert in which the child is facing to avoid any possible urination mistakes. The present invention may be completely sanitary, easy to use, and easy to attach without altering the fun way for the child and parent to approach toilet training.

When the child is sitting on the toilet in the reverse training manner, the invention may also comprise of foot rests or interactive components with the feet. These components may be part of the interactive device or connected to the insert configured for reverse positioning on the toilet. The foot rests or interactive components with the feet may also provide greater stability while using the toilet.

Alternatively, the insert may be configured for a child squatting over the toilet bowl. The insert may have a leveled rim where the child may position their feet such that they are over the toilet bowl opening. To increase stability, the leveled rim may have foot pads that are lined with materials that are tacky to the touch or a construction such as a plurality of grooves that increase traction of the child's feet. The leveled rim may have interactive features such as pressure activated sensors that activate music, lights, or other stimulating effects to keep the child engaged with the toilet. The insert may have a back portion configured for squatting that may provide greater support and safety, and a front barrier on the side of the insert to avoid any possible urination mistakes.

If the interactive device is separate from the insert, then the interactive device may be removed from the rear of the toilet and attached to the insert for compact transport and storage. The attachment may be through an interlocking connector system between the two components. In one alternative embodiment, the back surface of the interactive device may fit into a corresponding space on the back of the insert. Straps attached to the interactive device may be used to secure the interactive device to the insert. Said straps may also be used to strap the interactive device to the toilet. Alternatively, the straps may be retractable for more compact storage.

The interactive device may be positioned at the rear of the toilet by the use of at least one support arm and at least one base. The base provides stability to hold the interactive device and support arm upright for comfortable operation of the interactive device. The support arm may be telescopic or extendable to adjust for the child's dimensions. The support arm may be extended by adding support arm extenders wherein each extender has an interlocking connection with support arm, other extenders, and the interlocking device. Furthermore, the base may also have adjustable positioning of the support arm such as a plurality of slots each configured to hold the support arm at difference distances from the user. The base and the support arm may be connected by a hinge or an equivalent connector that would allow the support arm to fold down on to the base. This movement would enable the interactive device to fold on to the base for more compact storage.

In an alternative embodiment of the present invention, the interactive device may be connected to the insert. The insert may be connected to the aforementioned base. The insert may also act as the base itself. The support arm may be interconnected by a hinge and the interactive device would fold on to the insert. The folded configured may be secured through an interlocking connector system.

In an alternative embodiment of the present invention, the interactive device may have a reward feature wherein the child may access the reward feature after they have completed using the flush toilet. The reward feature may be associated with the flushing mechanism of the flush toilet wherein the association may be through the interactive device being capable of releasing the flush valve. This feature will enable the child to understand the benefits of using the toilet as well as to familiarize themselves with flushing the toilet.

In yet another embodiment of the present invention, the interactive device may be a projector that projects a light image, for example, a virtual touch screen, virtual keyboard such as an optically projected keyboard, or motion picture. The interactive device may have an optical sensor that detects a user's interaction with the projector or projected light image. The projector device may have speakers that provide audio signals that are associated with the projected image. The projector device may be attached to or constructed into the toilet seat, to the toilet lid, to the toilet bowl or to any other added component of a flush toilet, preferably in configuration that projects the image towards the rear of the toilet such as the surface of the toilet lid. Alternatively, the image may be projected onto the rear portion of the toilet, for example the exterior surface of the cistern. In another embodiment, the projector may be placed on the toilet cistern projecting an image visible to the child that is on or near the toilet. When the child is sitting on the flush toilet and is facing the rear portion of the toilet, the child can view and/or interact with the projected image. For example, the projector may have sensors that are capable of detecting the user's finger movement or touch of the projected patterns such that the user may convey an action or response to the projected image, essentially turning a portion of the toilet into a virtual touchscreen or an optically projected keyboard such as a virtual laser keyboard.

The projector device may be a digital light processing device and have a power supply source such as a battery, a light source, built in Wi-Fi connectivity, one of more connectivity ports such as a USB or micro USB port, a central processing unit. The projector device may be similar to a projector as found in wireless projection keyboard. The projector device may shine light, such as laser light, through a diffractive optical element that diffracts light into a desired image, for example a keyboard or a picture. The projector device may have special optical lenses that may expand the image to a usable size and to project the image onto a surface. The projector device may have an infrared laser diode that projects an infrared light on or near the projected visible light image. The projector device may have a complimentary metal-oxide semiconductor and/or a virtual interface processing core and/or a computer that allows the projector to position and analyze a user's fingers and/or hand movement.

The image may be projected onto any surface within the proximity to the toilet, for example onto a wall near the toilet such as directly behind the toilet, wherein the child may view the projected image while sitting facing the rear of the toilet. The image may also be projected onto the ground surface within the vicinity of the toilet. The projected image may also be projected onto the ceiling above the toilet.

The projection device may be attached to the toilet by straps, wherein the straps may wrap around the toilet lid or cistern. The projection device may be attached to the toilet lid or cistern via suction cups. The projection device may be attached to the toilet hinges or lid hinges or support arm. In an alternative embodiment, the projection device may be attached to the insert or be constructed to be a component within the insert, wherein the projected image may be projected onto the toilet lid, cistern, or on any surface within proximity to the toilet.

In yet another embodiment, the interactive device may be a lighted display, for example a flexible or bendable lighted display such as a screen, panel, curtain, or touchscreen. The flexible lighted display may be constructed onto a sleeve that can be attached to the toilet. For example, the flexible lighted display may be in the form of a glove or an open ended sleeve that slips onto the toilet lid, wherein the flexible lighted display faces the child allowing for visual and physical interaction with the display. The flexible lighted display may also be fitted over the cistern, displaying an image on the cistern, for example on the top of the cistern. In another embodiment, the lighted display may be attached to or constructed into the toilet insert, wherein the child faces down at the toilet insert to interact with the lighted display.

The present invention may also be configured for special needs individuals such as but not limited to autistic teens, and for healthy adults. The present invention may also be used to provide such users flush toilet training, physical support, convenience, and but not limited to, entertainment.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

Figure 1:
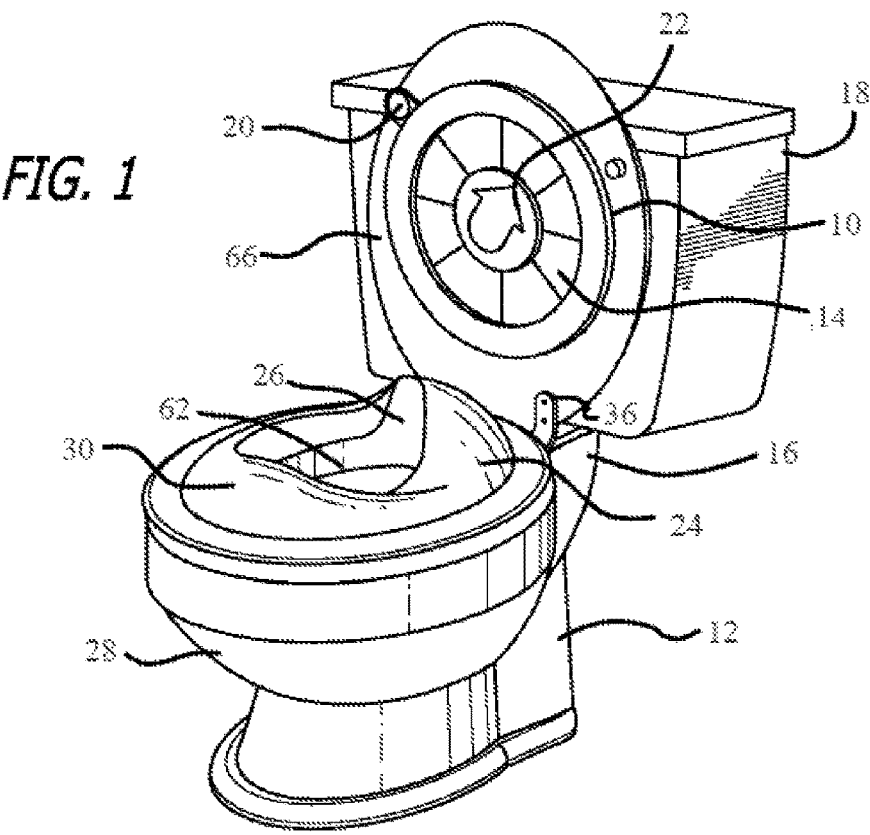
FIG. 1 a perspective view of a first embodiment of the present invention which includes a separate insert and an interactive device that is fastened to a toilet.

The invention will now be described with reference to FIG. 1, which is a front perspective view of an interactive device 10 and a flush toilet 12 wherein the interactive device 10 is a toy 14 attached to the inside of a toilet lid 66. The interactive device 10 is placed on the rear 16 of the flush toilet 12 wherein the rear 16 may comprise of flushing mechanism. The flushing mechanism may comprise of a cistern 18, a flush handle, and a flush valve. The interactive device 10 may be used on flush toilets without a cistern 18 or without a toilet lid 66. The interactive device 10 may be used on flush toilets with only a flush valve commonly found on commercial toilets. The interactive device 10 may be used on flush toilets wherein the cistern 18 is detached from the flush toilet 12.

The interactive device 10 may be constructed out of PVC or any other equivalent materials. The interactive device 10 may be attached to the inside of toilet lid 66 by suction cups, adhesive, elastic ties, or any other equivalent methods of attachment. The interactive device 10 may be attached to the toilet lid 66 by having support frame secured by utilizing the existing screws of the lid's hinges 36 wherein the lid's hinges 36 are originally used to connect the toilet lid 66 to the toilet bowl 28. Secure positioning of the toy 14 enables the user to operate the interactive device 10. The user may pull a lever 20 on the toy 14 and activate a spinning pointer 22 to illicit an entertaining and/or educational response from the toy 14. Other embodiments of the interactive device 10 may include but are not limited to a toy steering wheel with dash board displays or animated characters. The various equivalent embodiments may include responsive lights, sounds, music, pictures, videos, and various materials that provide tactile variety. The toy 14 should be made of easily washable materials that are inherently hygienic, such as non-porous PVC.

An insert 24 may be used in combination with the interactive device 10. In the preferred embodiment of FIG. 1, the insert 24 may be of a soft, viscoelastic material. The insert 24 may also be filled with a cushiony filler, such as a corn based material or gel. The exterior of insert 24 may be composed of a more semi-rigid material such as PVC or any other equivalent materials that are easily washable and/or inherently hygienic. The insert 24 may be contoured so that the child may sit comfortably facing the Interactive device 10. The insert 24 may also be configured to have a barrier 26 that acts as a splash guard for any toilet use related accidents or spills.

The insert 24 may also have support features that would prevent the child from falling into the bowl 28 while sitting in a reverse position or falling off the bowl 28 such as a support backing 30. The insert 24 may have handles or foot pads to provide the child with greater stability. The insert 24 may have an inner rim 62 in the insert opening that extends downwardly into the bowl and prevents the insert 24 from being displaced from the top of the bowl 28. The insert 24 may have straps or equivalent means of securing the insert 24 to the top of the bowl. The insert 24 may be placed on top of an adult toilet seat commonly found on flush toilets.

In an alternate embodiment, the insert may be configured for a child to squat over the bowl. The insert would be configured with stable regions in which the child can squat with sufficient stability and a low risk of slipping.

Figure 2:
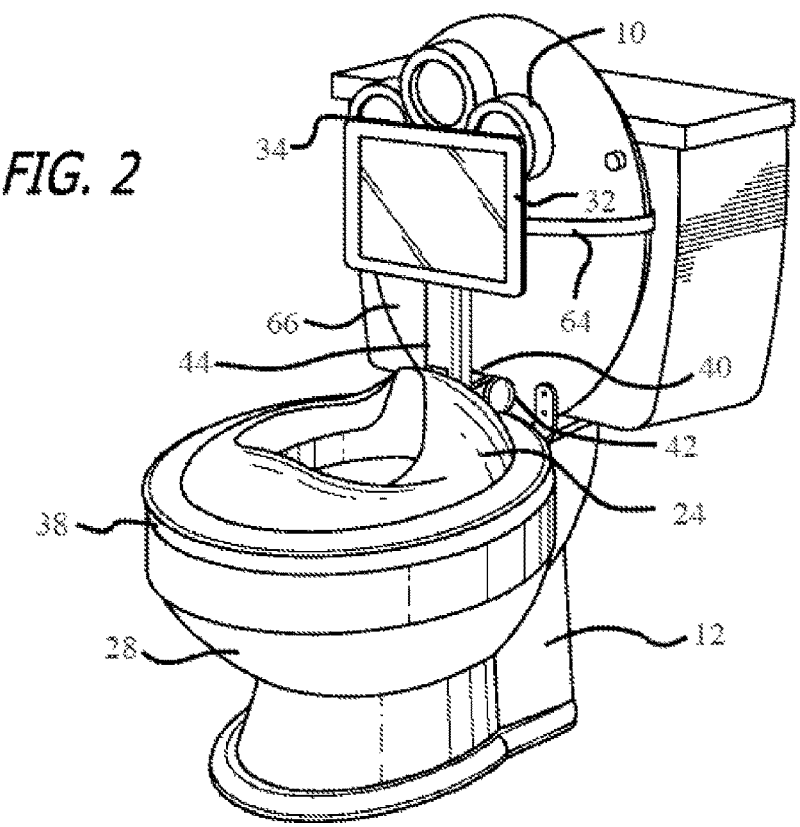
FIG. 2 a perspective view of an alternative embodiment of the present invention which includes a computer tablet connected to a support arm, a hinge, and a base.

FIG. 2 is a front perspective view of another embodiment of the interactive device 10 wherein said interactive device may comprise of a computer tablet 32. The interactive device 10 may be any computing device and may be removable from a frame 34 of the interactive device 10. The embodiment may also be one complete integrated unit, with the insert 24 attached to the interactive device 10. The interactive device 10 portion may be fastened to the toilet lid 66 by straps 64 or any other equivalent means. The interactive device 10, combined with the insert 24 and connected to the toilet lid 66 allows the child to sit more comfortably facing the rear 16, avoids any possibility of urine splash, and allays any parental concerns about the child falling into the bowl 28 while sitting in a reverse position, or the toilet lid 66 falling down on to the child.

Figure 3:
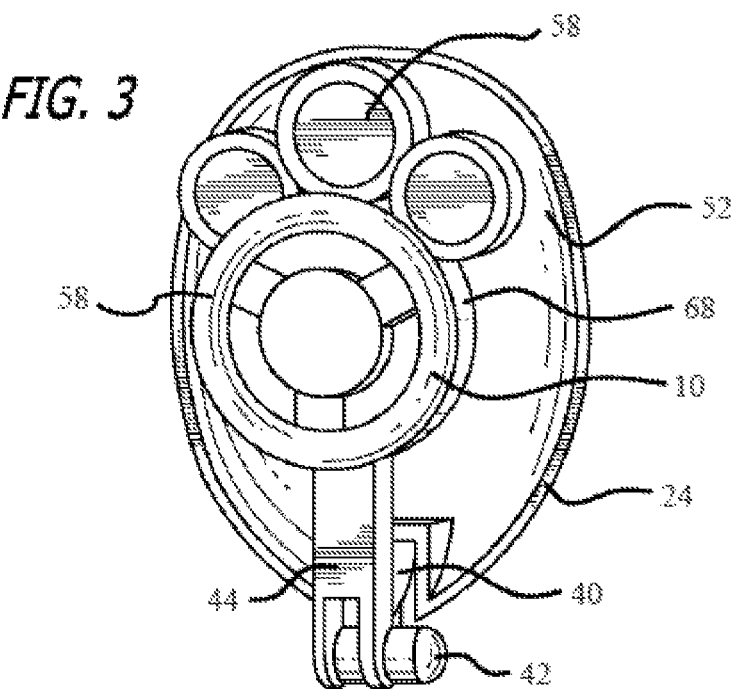
FIG. 3 is a perspective view of an embodiment similar to that of FIG. 2 in which the present invention is folded into a more compact configuration of the invention.
Figure 4:
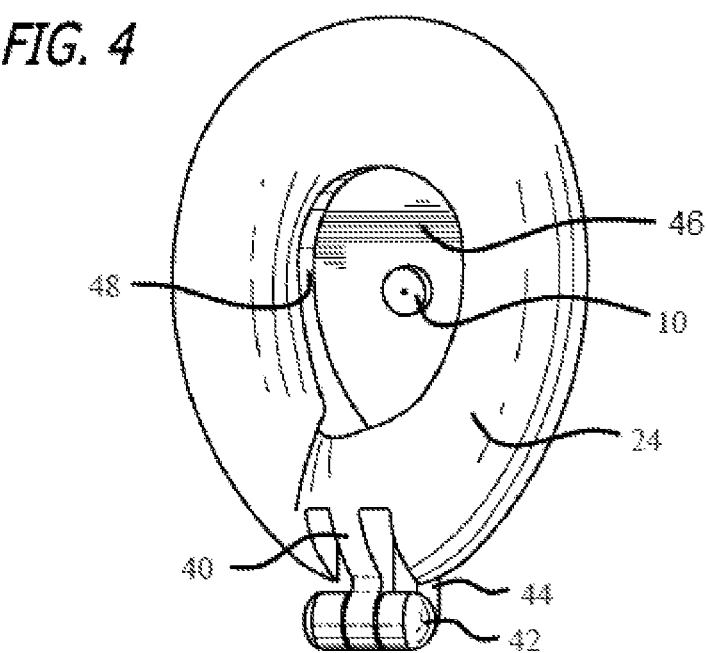
FIG. 4 is a perspective view of the embodiment of FIG. 3 that shows the other side of the present invention in its compact configuration.

The attached insert 24 is connected to a base 40 which is connected to a hinge 42. The hinge 42 is connected to a support arm 44, wherein the support arm 44 is connected to the interactive device 10. The hinge 42 is configured such that the support arm 44 does not rotate downwardly to the insert 24 thereby preventing the toilet lid 16 from being lowered on top 38 of the bowl 28. Rather, the hinge 42 is only able to rotate the support arm 44 when the unit is removed from the flush toilet 12 and folded in such a manner as shown in FIGS. 3 & 4. The base 40 and the support arm 44 may also be connected by other bendable connectors or may be connected in a rigid manner where no rotation of the support arm is possible 44, as shown in an alternate embodiment in FIG. 5.

FIG. 3 and FIG. 4 are perspective views of another embodiment of the interactive device 10 with an attached insert 24, and a base 40, a hinge 42, and a support arm 44. In this embodiment, the hinge rotates in one direction such that the bottom side of the insert 24 faces the back surface 46 of the interactive device 10. The hinge 42 allows the attached insert 24 to fold on to the interactive device 10 when the interactive device 10 is not in use. The preferred embodiment comprises a hinge that may be capable of locking into the upright position when in use, as shown in FIG. 2, and also lock into a folded configuration when not in use in FIG. 3 and FIG. 4.

In FIG. 3 and FIG. 4, the folded configuration enables the interactive device to be easily transported or stored when not in use. The folded configuration allows any surfaces on the insert 24 which may be commonly soiled not to directly touch the interactive parts 58 of the interactive device 10. In FIG. 4, the back surface 46 of the interactive device 10 fits against the rim 48 of the attached insert 24 wherein there is a reduced chance of any soiling of the front surface 50 of the interactive device 10. The back surface 46 of the interactive device 10 is preferred to have side walls 68 wherein said side walls 68 cup the back surface 46 and fit around the rim 48 of the attached insert 24. In FIG. 3, the under surface 52 of the attached insert 24 may be concaved such that back surface's 46 sides walls can be inserted within the cavity created by the concaved shape of the under surface 52 of the attached insert 10.

Figure 5A:
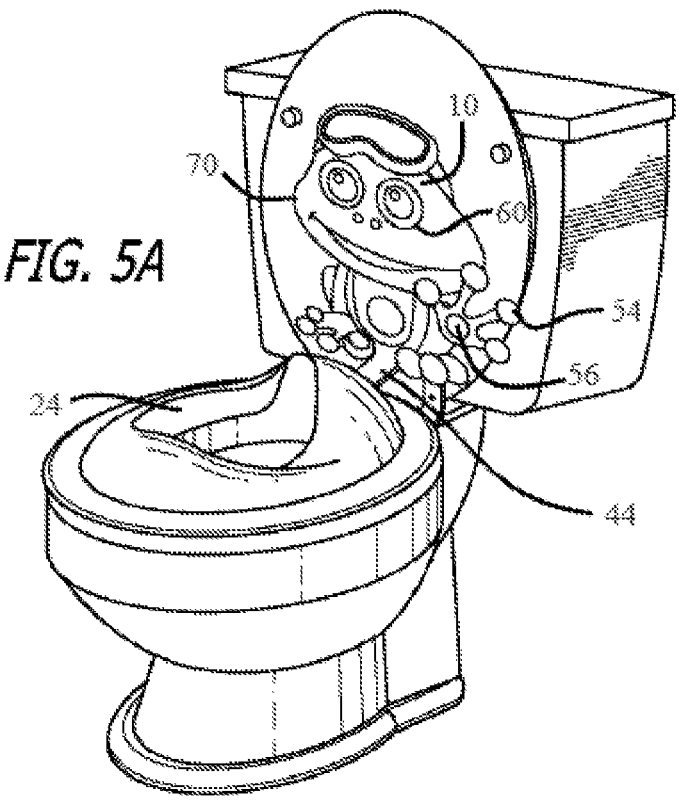
FIG. 5A and FIG. 5B is a perspective view of an embodiment with a reward feature and an unbendable support arm.
Figure 5B:
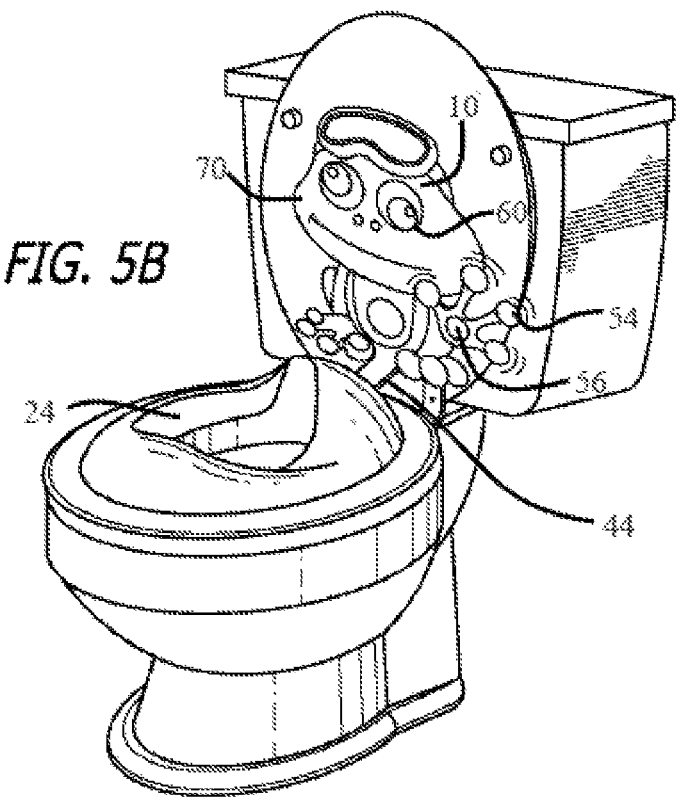

FIG. 5A and FIG. 5B is a perspective view of another embodiment of an interactive device 10 wherein the interactive device 10 has an interactive feature 54 that may be used to reward the child when the child has finished using the flush toilet. The interactive feature 54 may be configured as a hand 56 of an animated character 70 wherein the user may give a "high five" to the hand 56, and the "high five" triggers an audible reward and/or visual reward response 60. The interactive feature 54 may also be a handle that turns gears and may trigger a reward response 60 which may include but is not limited to animated movements such as eye movement, sounds, music, and lights. The handle may be conformed similar to the shape of the actual flush toilet handle wherein the user familiarizes themselves with the act of flushing a toilet. The interactive feature 54 may even be connected to the flushing mechanism of the toilet, and thereby control the flushing mechanism.

FIG. 5A and FIG. 5B also show a rigid and bent support arm 44 connected to the interactive device 10 and the insert 24. The rigid support arm 44 prevents the lid 66 from falling down.

Figure 6A:
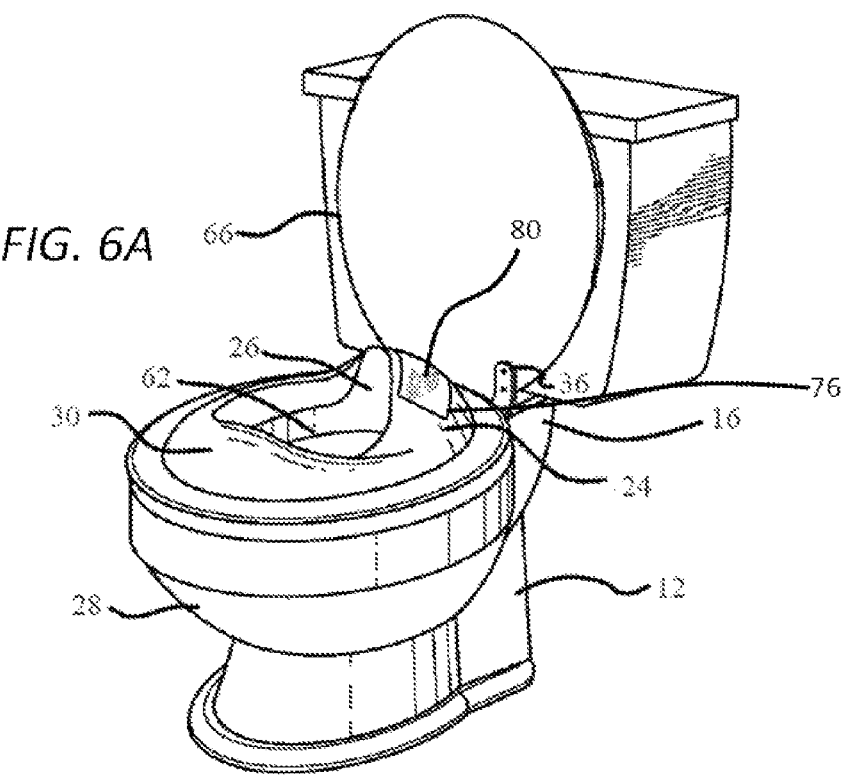
FIG. 6A and FIG. 6B is a perspective view of an embodiment of a toilet seat insert with a flexible lighted display.

FIG. 6A is a perspective view of an embodiment of a toilet insert 24 wherein a lighted display device 76 is constructed within the insert 24 wherein an image such as an interactive image 80 is displayed on or by the lighted display device 76, inherently making the insert 24 itself an interactive toy. The lighted display device 76 may be any device that projects a light image, for example but not limited to, an electronic device such as a television screen, computer screen, or touchscreen, where images and/or data are displayed. In an alternative embodiment, the lighted display device 76 may be a projector that comprises an optical system that projects an image or moving images onto a surface. The lighted display device 76 may be powered by an internal power source such as a battery. The lighted display device may be movable or adjustable so that a user can direct the lighted display device to a desired angle or position for viewing. A user may face down at the display device for easy interaction.

In a preferred embodiment, the surface of the touchscreen may be approximately flush with the toilet insert wherein the edges or top surface of the touchscreen and the top surface of the insert appear to be even or level with each other. In other embodiments, the edges or top surface of the touch screen may be slightly above or below the surface of the insert. In another embodiment, one edge of the touchscreen may be raised higher than other edges of the insert. The touchscreen may have any shape such as a rectangular, square, or circular and may be contoured to or have similar or unitary curvature as the insert.

Figure 6B:
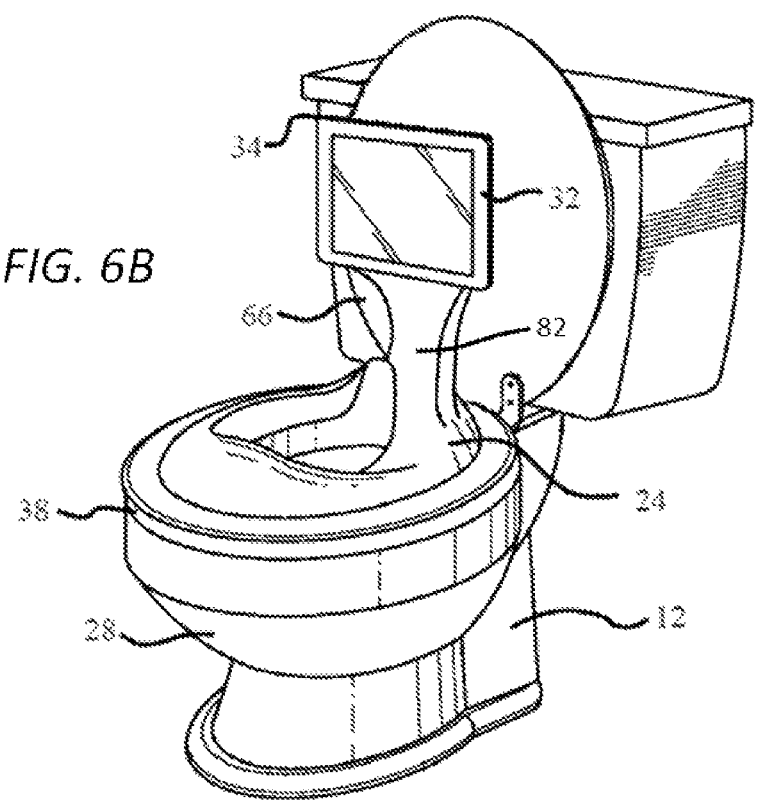

FIG. 6B is an alternative embodiment of the insert 24 wherein a lighted display device 76 may be constructed to extend from the insert 24 and positioned so that a user can face forward while interacting with the lighted display device 76. For example, a touchscreen or a computer tablet 32 may be attached to the insert 24 by an extension arm 82 from the insert 24. The lighted display device may be attached to the distal end of the arm extension. The extension arm 82 may be made of unitary construction with the insert 24 as shown in FIG. 6B or a separate piece from the insert 24. The extension arm 82 may be extendable, bendable, and/or flexible between the distal end and the proximal end so as to allow a user to position the touchscreen at a desired angle and/or distance. In a preferred embodiment the touchscreen has a square or a rectangular shape but may be constructed to have any shape. The extension arm 82 may be partially or fully moveable or retractable into the interior of the insert 24, in which a fully retracted extension arm 82 allows for the lighted display device 76 to be positioned to be flush or almost flush with the insert 24. The partially or fully movable or retractable extension arm 82 allows a user to adjust the lighted display device 76 to be positioned at a desired angle for viewing.

In yet another embodiment, wherein the interactive device 10 is a toy 14, the toy 14 may be constructed with the insert 24, wherein the toy 14 may extend from any portion of the insert 24. In a further embodiment the insert 24 and the toy 10, or one or more components of the toy 10, may be made of unitary construction. For example, the toy 14 may be a steering wheel and/or foot pedals and/or push buttons that extend from the insert. The insert 24 may have a computer system and/or speakers to make the toy 10 interactive with the user.

Figure 7A:
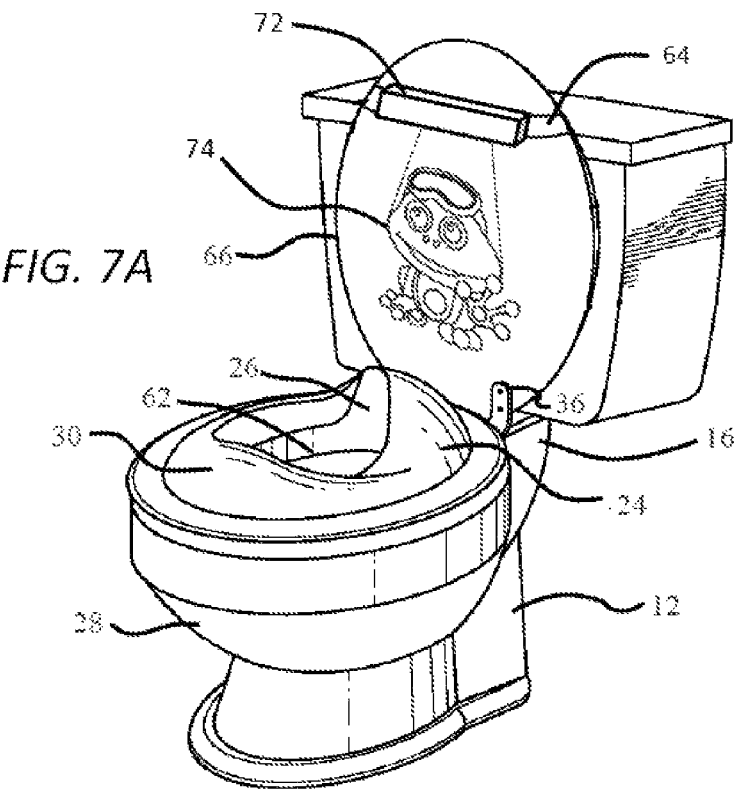
FIG. 7A and FIG. 7B is a perspective view of an embodiment with a projection device attached to the toilet lid.
Figure 7B:
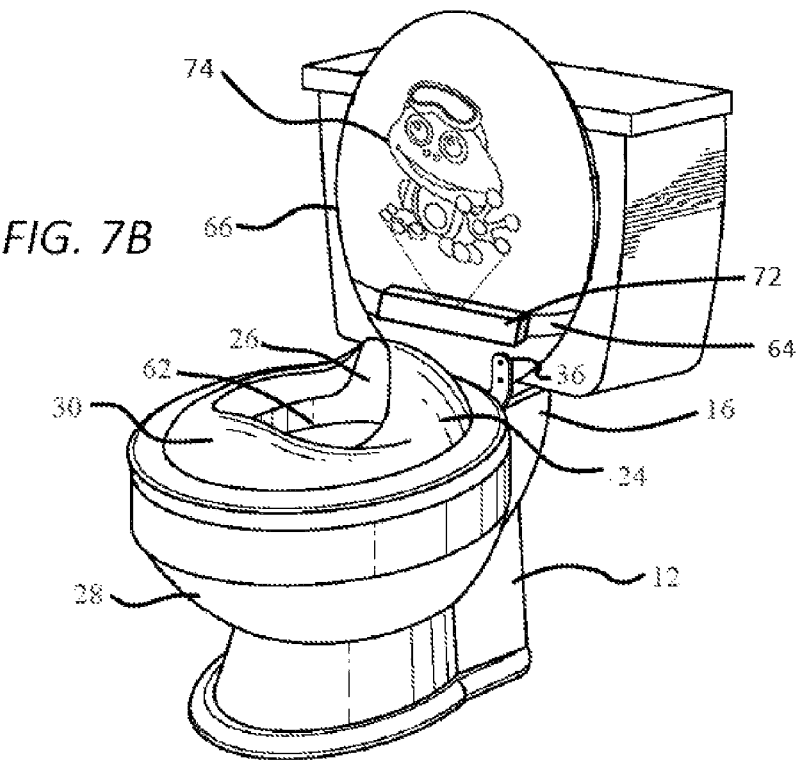

FIG. 7A and FIG. 7B is a perspective view of two possible embodiments with a projection device 72 attached to the toilet lid 66 by straps 64. The projection device 72 is attached at the top of the toilet lid 66 in FIG. 7A where it may be used in combination with an insert 24. In another embodiment, the projection device is attached to the bottom of the toilet lid 66 in FIG. 7B. The projected image 74 may be projected onto the surface of the toilet lid 66.

Figure 8:
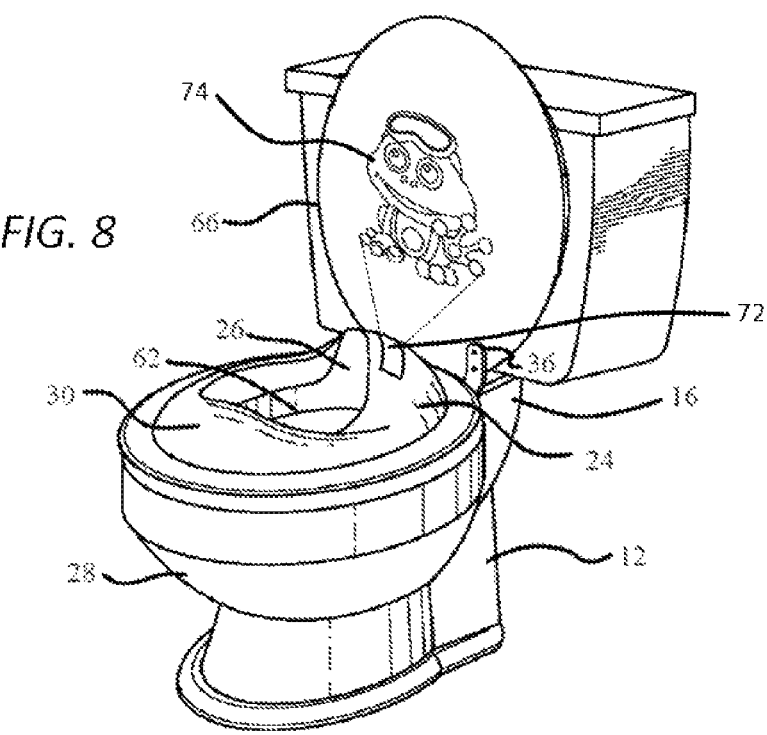
FIG. 8 is a perspective view of an embodiment with a projection device built into the toilet insert.

FIG. 8 is a perspective view of an embodiment with a projection device 72 constructed within the insert 24 and comprises an optical system, wherein the projection device projects an image 74 such as an interactive image onto a surface visible when the user is sitting on the flush toilet in the rearward position. Exemplary surfaces may include of a toilet lid 66, or the exterior surface of the cistern. The image projected by the projection device 72 may comprise any lighted display, for example a motion picture, a still picture, light that may fluctuate in color and intensity, a laser, or an interactive lighted display such as a light virtual laser keyboard. In another embodiment the projected light may be a holographic projection.

In a preferred embodiment, the projection device 72 may be approximately flush with the toilet insert 24 wherein the edges or top surface of the projection device 72 and the top surface of the insert 24 appear to be even or level with each other. In another embodiment, the edges or top surface of the projection device 72 may be slightly above or below the surface of the insert 24. In yet another embodiment, one edge of the projection device may be raised higher than other edges of the insert. The projection device may be movable or adjustable so that a user can direct the projection of an image onto any desired surface. The projection device may have any shape such as a rectangular, square, or circular shape and may be contoured to or have similar or unitary curvature as the insert 24. The projection device 72 may be protected from water by a water resistant and preferably antimicrobial cover, such as a cover made from transparent polyurethane or a similar material.

The projection device 72 may be attached to an extension arm wherein the extension arm is extendable, bendable, and/or flexible so as to allow a user to position the projection device at a desired angle and/or distance to a projection surface. The extension arm may be partially or fully moveable or retractable into the interior of the insert 24, in which a fully retracted extension arm 82 allows for the projection device 72 to be positioned to be flush or almost flush with the insert 24. The partially or fully movable or retractable extension arm 82 may allow a user to adjust the projection device 76 to be positioned at a desired angle and/or distance for projecting an image onto a surface.

Figure 9:
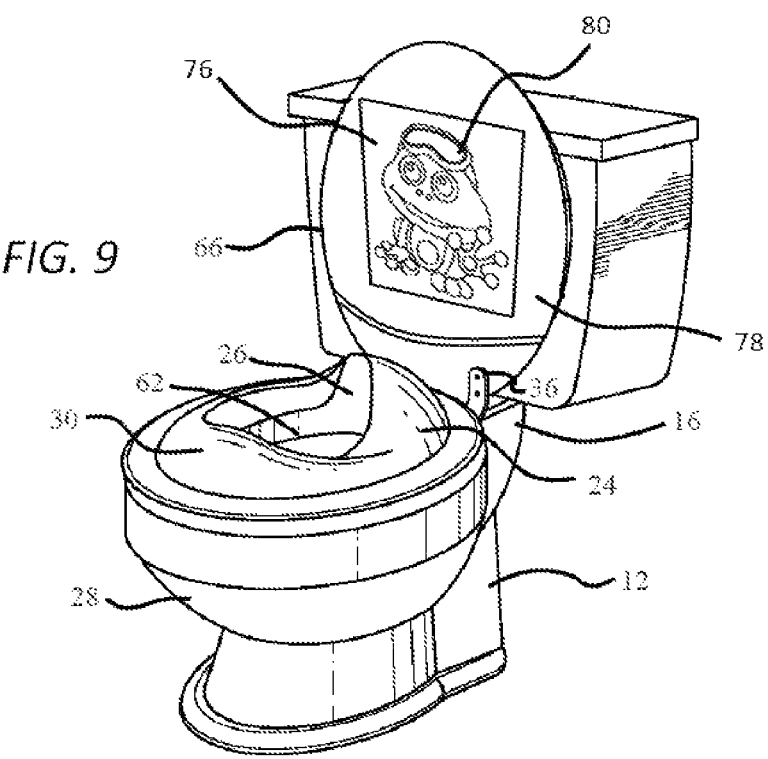
FIG. 9 is a perspective view of an embodiment of a toilet lid sleeve with a flexible lighted display.

FIG. 9 is a perspective view of a preferred embodiment of a toilet lid sleeve 78 with a lighted display device 76 facing the user, wherein the display device may be for example an LED display or a touchscreen or a projection device and displays or projects an image such as a motion picture, still light image, or an interactive image 80. The toilet lid sleeve 78 may be constructed to fit over a toilet lid, in which the toilet lid sleeve 78 may be stretchable to fit on a variety of toilet lid shapes and sizes. The display device may be protected from water by a water resistant and preferably antimicrobial cover, such as a cover made from transparent polyurethane or a similar material. In another embodiment the lighted display device 76 may be constructed to fit over a toilet cistern.

While the specification describes particular embodiments of the present invention, those of ordinary skill can devise variations of the present invention without departing from the inventive concept.

The invention claimed is:

1. An interactive device to be used in combination with a flush toilet comprising: an insert configured to be placed atop a bowl of the flush toilet and the insert reduces the dimensions of an opening of the bowl; an interactive component that is positioned towards the rear of the flush toilet such that a user of the flush toilet is able to interact with the interactive component while facing the rear of the toilet while on the toilet; and the interactive component comprising a lighted display device.

2. The interactive device of claim 1 wherein said lighted display device comprises a projector.

3. The interactive device of claim 2 wherein said projector is configured to project an image on to a projection surface.

4. The interactive device of claim 2 wherein said projector is configured to project an image on to the back surface of a toilet.

5. An interactive device to be used in combination with a flush toilet comprising: an insert that is configured to placed atop a bowl of the flush toilet and the insert reduces the dimensions of an opening of the bowl; an interactive component that may be positioned at the rear of the flush toilet such that a user of the flush toilet is able to interact with the interactive component while facing the rear while on the toilet; and the interactive component comprising a light projecting device.

6. The interactive device of claim 5 in which said light projecting device projects an image onto a surface, wherein the surface comprises the surface of a toilet, a toilet lid, a cistern, a wall, a floor, and/or a ceiling.

* * * * *